US008977133B2

(12) United States Patent
Schmidt (10) Patent No.: US 8,977,133 B2
(45) Date of Patent: Mar. 10, 2015

(54) DISTRIBUTED COMMUNICATIONS SYSTEM EMPLOYING FREE-SPACE-OPTICAL LINK(S), AND RELATED COMPONENTS AND METHODS

(75) Inventor: Gerald B. Schmidt, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 235 days.

(21) Appl. No.: 13/485,143

(22) Filed: May 31, 2012

(65) Prior Publication Data

US 2013/0322884 A1 Dec. 5, 2013

(51) Int. Cl.
*H04B 10/00* (2013.01)

(52) U.S. Cl.
USPC .............................. 398/118; 398/115; 398/116

(58) Field of Classification Search
CPC ........... H04B 10/1123; H04B 10/1127; H04B 10/1129; H04B 10/116
USPC .......................................... 398/115–116, 118
See application file for complete search history.

(56) References Cited

U.S. PATENT DOCUMENTS

| 4,710,977 | A | 12/1987 | Lemelson | 455/603 |
|---|---|---|---|---|
| 6,681,116 | B1 | 1/2004 | Johnson | 455/552.1 |
| 8,526,403 | B1 * | 9/2013 | Nadji et al. | 370/338 |
| 2002/0055371 | A1 | 5/2002 | Arnon et al. | 455/562 |
| 2002/0114038 | A1 | 8/2002 | Arnon et al. | 359/145 |
| 2003/0078052 | A1 | 4/2003 | Atias et al. | 455/453 |
| 2004/0156638 | A1 * | 8/2004 | Graves et al. | 398/129 |
| 2005/0123301 | A1 * | 6/2005 | Kallstenius | 398/115 |
| 2006/0094470 | A1 * | 5/2006 | Wake et al. | 455/562.1 |

FOREIGN PATENT DOCUMENTS

WO  WO2008/0055436 A2  6/2005

OTHER PUBLICATIONS

Sify News, "Wireless bridge takes high speed communications to 'last mile'," http://www.sify.com/news, Feb. 28, 2012, 4 pages.
Patent Cooperation Treaty, International Search Report, Aug. 8, 2013, 4 pages.

* cited by examiner

*Primary Examiner* — Dzung Tran
(74) *Attorney, Agent, or Firm* — C. Keith Montgomery (57) ABSTRACT

Distributed communications systems employing one or more free-space-optics (FSO) links, and related components and methods are disclosed. In one embodiment, a distributed communications system is provided in which one or more links of a communications path located between a central unit and a remote unit include FSO provided by one or more FSO components. The FSO component(s) can replace optical fiber (or copper) cable assembly and the associated electrical/optical and optical/electrical converter circuitry. Note that FSO and fiber cable links may be used in a mixed fashion depending on the particular requirements of a given installation project for a distributed communications system. Use of such FSO components may allow temporary installations to be effectuated with greater ease and more economically since physical cable is not required for the FSO portion of the communications path. Likewise, installation obstacles associated with physical cable may be eliminated for portion of the communications paths that employ FSO.

17 Claims, 10 Drawing Sheets

DISTRIBUTED COMMUNICATIONS SYSTEM EMPLOYING FREE-SPACE-OPTICAL LINK(S), AND RELATED COMPONENTS AND METHODS

BACKGROUND

1. Field of the Disclosure

The technology of the disclosure relates to distributed communications systems, including distribute antenna systems.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" to communicate with an access point device. Distributed antenna systems are particularly useful to be deployed inside buildings or other indoor environments where client devices may not otherwise be able to effectively receive RF signals from a source, such as a base station for example.

Distributed antenna systems are typically installed on a permanent basis either in a new building or as a retrofit to an existing building (or other locale such as a tunnel, an outdoor venue, a plaza, a mall, a stadium, or the like). Such installations are well understood. There are, however, other situations where the installation of a distributed antenna system is temporary. While these temporary installations often do not generate measurable, positive revenue for an operator, in many instances, these temporary installations are high profile events such as concerts, sporting events, exhibitions, disaster recovery events, and conferences.

Currently operators may have teams of installation professionals dedicated to solve the challenging coverage and capacity requirements of such temporary installations. Such teams would benefit from systems and techniques that simplify temporary installations and make such installations more economical.

SUMMARY OF THE DETAILED DESCRIPTION

Embodiments disclosed herein include distributed communications systems employing one or more free-space-optics (FSO) links. Related components and methods are also disclosed. In one embodiment, a distributed communications system is provided in which one or more links of a communications path located between a central unit and a remote unit include FSO provided by one or more FSO components. The FSO component(s) can replace optical fiber cable assembly and the associated electrical/optical and optical/electrical converter circuitry. Alternatively the FSO component(s) may replace other communication links such as a copper coaxial cable or Ethernet (e.g., cat 5, cat 6 or the like) cabling. Note that FSO and fiber cable links may be used in a mixed fashion depending on the particular requirements of a given installation project for a distributed communications system. Use of such FSO components may allow temporary installations to be effectuated with greater ease and more economically since physical cable is not required for the FSO portion of the communications path. Likewise, installation obstacles associated with physical cable may be eliminated for portion of the communications paths that employ FSO.

In this regard in one embodiment, a distributed communications system is provided. The distributed communications system comprises a central unit comprising at least one downlink input configured to receive downlink communications signals; and a communications path communicatively coupling the central unit and at least one remote unit. The at least one remote unit is configured to receive the downlink communications signals over the communications path and at least a portion of the communications path comprises at least one free-space-optics (FSO) communications link.

In another embodiment, a method for providing communications links is provided. The method comprises establishing a communications path between a central unit of a distributed communications system and a remote unit of the distributed communications system wherein the communications path comprises at least one free-space-optics (FSO) link.

As non-limiting examples, the distributed communications system may be an indoor distributed communications system, the central unit may be a head end unit, and the particular FSO link within the communications path may be varied.

Additional features and advantages will be set forth in the detailed description which follows, and in part will be readily apparent to those skilled in the art from that description or recognized by practicing the embodiments as described herein, including the detailed description that follows, the claims, as well as the appended drawings.

The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include distributed communications systems employing one or more free-space-optics (FSO) links. Related components and methods are also disclosed. In one embodiment, a distributed communications system is provided in which one or more links of a communications path located between a central unit and a remote unit include FSO provided by one or more FSO components. The FSO component(s) can replace optical fiber cable assembly and the associated electrical/optical and optical/electrical converter circuitry. Note that FSO and fiber cable links may be used in a mixed fashion depending on the particular requirements of a given installation project for a distributed communications system. Use of such FSO components may allow temporary installations to be effectuated with greater ease and more economically since physical cable is not required for the FSO portion of the communications path. Likewise, installation obstacles associated with physical cable may be eliminated for portion of the communications paths that employ FSO.

Before addressing embodiments of employing FSO in one or more communications paths in distributed communications systems, an overview of exemplary embodiments of distributed communications systems are provided with reference to FIGS. 1-5A. Numerous communications paths are disclosed in these distributed communications systems. During the introduction of a given communications path, such communications path may be described as being an optical fiber link or an electrical medium link. Exemplary embodiments of the present disclosure replace one or more of these communications paths with a FSO component to assist in installation, especially in temporary venues.

Figure 1:
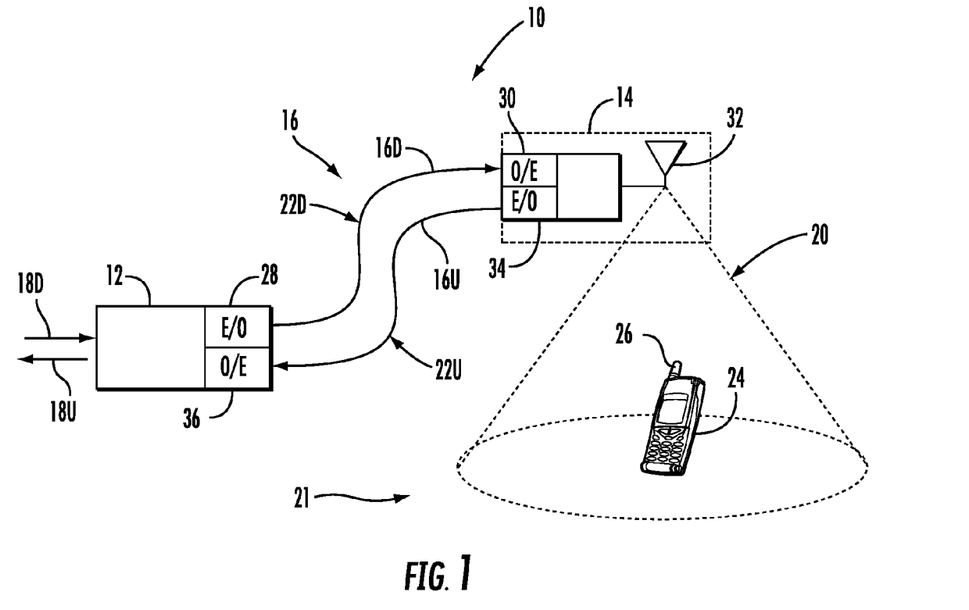
FIG. 1 is a schematic diagram of an exemplary optical fiber-based distributed communications system.

FIG. 1 is a schematic diagram of an embodiment of an optical fiber-based distributed communications system, which can be a distributed antenna system. In this embodiment, the system is an optical fiber-based distributed communications system 10 that is configured to create one or more antenna coverage areas for establishing communications with wireless client devices located in the RF range of the antenna coverage areas. The optical fiber-based distributed communications system 10 provides RF communications services (e.g., cellular services). In this embodiment, the optical fiber-based distributed communications system 10 includes a central unit 12, which, in an exemplary embodiment is head-end equipment (HEE), such as a head-end unit (HEU), one or more remote units such as remote antenna unit (RAU) 14, and an optical fiber 16 that optically couples central unit 12 to the RAU 14. The communications path formed by the optical fiber 16 is the sort of communications path that may be replaced by appropriate FSO components. More detail about the FSO components is provided below with reference to FIG. 5A.

Note that FSO products for RF and/or digital transport are commercially available from LightPointe Communications, Inc. of 11696 Sorrento Valley Road, Ste. 101, San Diego, Calif. 92121. Products from LightPointe may be used in conjunction with embodiments of the present disclosure where the present disclosure discusses an FSO link. For more information, the interested reader is referred to www.lightpointe.com.

With continuing reference to FIG. 1, the RAU 14 is a type of remote communications unit. In general, a remote communications unit can support wireless communications, wired communications, or both. The RAU 14 can support wireless communications and may also support wired communications. The central unit 12 includes at least a downlink input that is configured to receive communications over downlink electrical RF signals 18D from a source or sources, such as a network or carrier as examples, and provide such communications to the RAU 14. The central unit 12 is also configured to return communications received from the RAU 14, via uplink electrical RF signals 18U, back to the source or sources. In this embodiment, the optical fiber 16 includes at least one downlink optical fiber 16D to carry signals communicated from the central unit 12 to the RAU 14 and at least one uplink optical fiber 16U to carry signals communicated from the RAU 14 back to the central unit 12. One downlink optical fiber 16D and one uplink optical fiber 16U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are disclosed in U.S. patent application Ser. No. 12/892,424, any of which can be employed in any of the embodiments disclosed herein.

The optical fiber-based distributed communications system 10 has an antenna coverage area 20 that can be disposed about the RAU 14. The antenna coverage area 20 of the RAU 14 forms an RF coverage area 21. The central unit 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the central unit 12 includes an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the central unit 12 converts the uplink optical RF signals 22U into uplink electrical RF signals, which can then be communicated as uplink electrical RF signals 18U back to a network or other source. The central unit 12 in this embodiment is not able to distinguish the location of the client devices 24 in this embodiment. The client device 24 could be in the range of any antenna coverage area 20 formed by an RAU 14.

Figure 2:
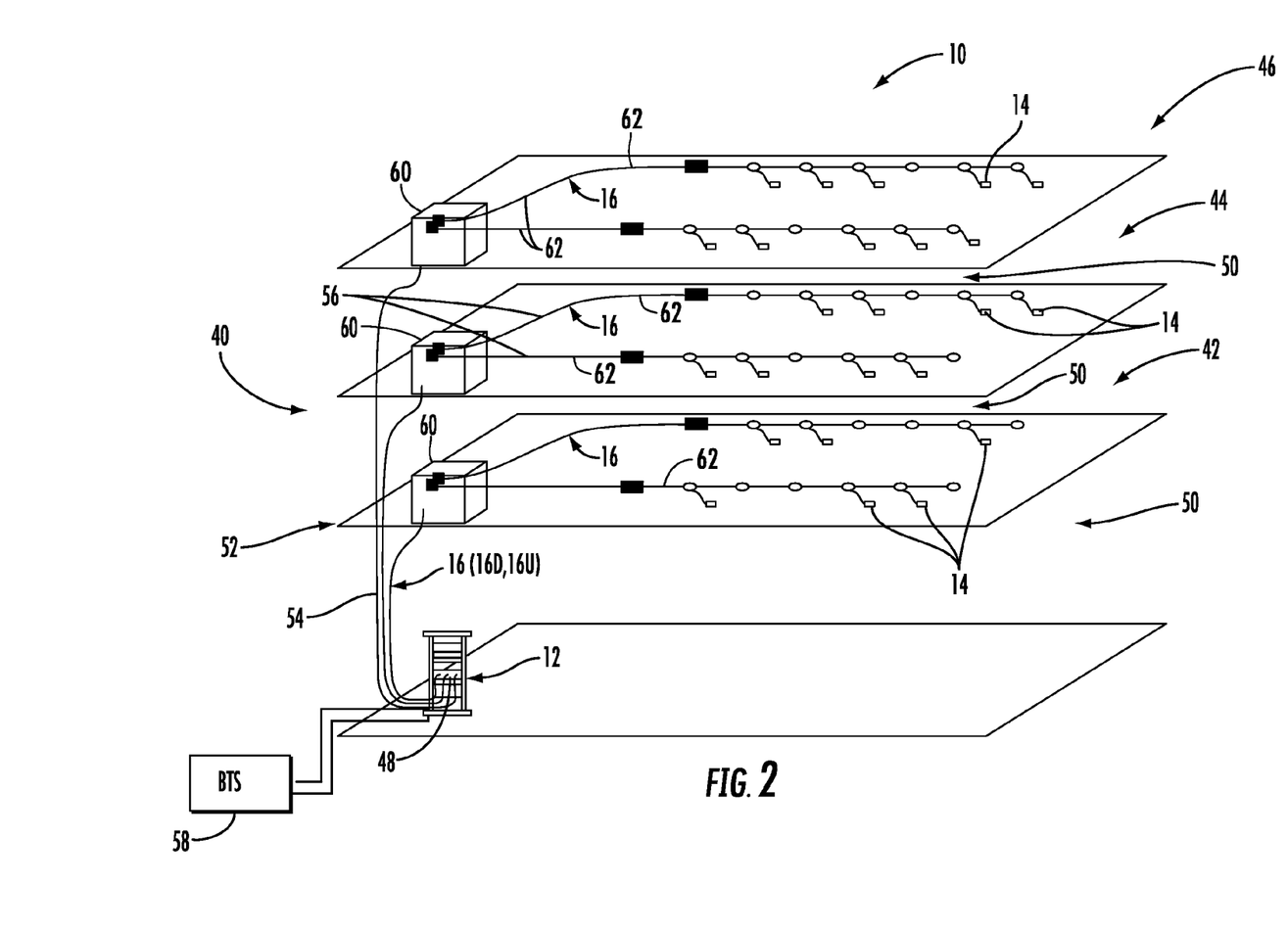
FIG. 2 is a partially schematic cut-away diagram of an exemplary building infrastructure in which an optical fiber-based distributed communications system is employed.

To provide further exemplary illustration of how an optical fiber-based distributed communications system can be deployed indoors, FIG. 2 is provided. FIG. 2 is a partially schematic cut-away diagram of a building infrastructure 40 employing an optical fiber-based distributed communications system. The system may be the optical fiber-based distributed communications system 10 of FIG. 1. The building infrastructure 40 generally represents any type of building in which the optical fiber-based distributed communications system 10 can be deployed, but in an exemplary embodiment may be a concert venue, sporting event venue, convention hall, or the like where the installation of the distributed communications system 10 is intended to be temporary. As previously discussed with regard to FIG. 1, the optical fiber-based distributed communications system 10 incorporates the central unit 12 to provide various types of communications services to coverage areas within the building infrastructure 40, as an example. For example, as discussed in more detail below, the optical fiber-based distributed communications system 10 in this embodiment is configured to receive wireless RF signals and convert the RF signals into RoF signals to be communicated over the optical fiber 16 to multiple RAUs 14. The optical fiber-based distributed communications system 10 in this embodiment can be, for example, an indoor distributed communications system (IDAS) to provide wireless service inside the building infrastructure 40. These wireless signals can include cellular service, wireless services such as RFID tracking, Bluetooth®, GPS, near field communication (NFC), Wireless Fidelity (WiFi), local area network (LAN), WLAN, public safety, wireless building automations, and combinations thereof, as examples.

With continuing reference to FIG. 2, the building infrastructure 40 in this embodiment includes a first (ground) floor 42, a second floor 44, and a third floor 46. The floors 42, 44, 46 are serviced by the central unit 12 through a main distribution frame 48 to provide antenna coverage areas 50 in the building infrastructure 40. Only the ceilings of the floors 42, 44, 46 are shown in FIG. 2 for simplicity of illustration. In the example embodiment, a main cable 52 has a number of different sections that facilitate the placement of a large number of RAUs 14 in the building infrastructure 40. Each RAU 14 in turn services its own coverage area in the antenna coverage areas 50. The main cable 52 can include, for example, a riser cable 54 that carries all of the downlink and uplink optical fibers 16D, 16U to and from the central unit 12. The riser cable 54 may be routed through an interconnect unit (ICU) 60. The ICU 60 may be provided as part of or separate from a power supply. The ICU 60 may also be configured to provide power to the RAUs 14 via the electrical power line, provided inside an array cable 62, or tail cable or home-run tether cable as other examples, and distributed with the downlink and uplink optical fibers 16D, 16U to the RAUs 14. The main cable 52 can include one or more multi-cable (MC) connectors adapted to connect select downlink and uplink optical fibers 16D, 16U, along with an electrical power line, to a number of optical fiber cables 56.

The main cable 52 enables multiple optical fiber cables 56 to be distributed throughout the building infrastructure 40 (e.g., fixed to the ceilings or other support surfaces of each floor 42, 44, 46) to provide the antenna coverage areas 50 for the first, second, and third floors 42, 44, and 46. In an example embodiment, the central unit 12 is located within the building infrastructure 40 (e.g., in a closet or control room), while in another example embodiment, the central unit 12 may be located outside of the building infrastructure 40 at a remote location. A base transceiver station (BTS) 58, which may be provided by a second party such as a cellular service provider, is connected to the central unit 12, and can be co-located or located remotely from the central unit 12. A BTS is any station or signal source that provides an input signal to the central unit 12 and can receive a return signal from the central unit 12. In a typical cellular system, for example, a plurality of BTSs is deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communications with one or more subscriber units operating within the associated cell. As another example, wireless repeaters or bi-directional amplifiers could also be used to serve a corresponding cell in lieu of a BTS. Alternatively, radio input could be provided by a repeater, picocell or femtocell as other examples.

The optical fiber-based distributed communications system 10 in FIGS. 1 and 2 and described above provides point-to-point communications between the central unit 12 and the RAU 14. A multi-point architecture is also possible as well. With regard to FIGS. 1 and 2 each RAU 14 communicates with the central unit 12 over a distinct downlink and uplink optical fiber pair to provide the point-to-point communications. Whenever an RAU 14 is installed in the optical fiber-based distributed communications system 10, the RAU 14 is connected to a distinct downlink and uplink optical fiber pair connected to the central unit 12. The downlink and uplink optical fibers 16D, 16U may be provided in a fiber optic cable. Multiple downlink and uplink optical fiber pairs can be provided in a fiber optic cable to service multiple RAUs 14 from a common fiber optic cable. For example, with reference to FIG. 2, RAUs 14 installed on a given floor 42, 44, or 46 may be serviced from the same optical fiber 16. In this regard, the optical fiber 16 may have multiple nodes where distinct downlink and uplink optical fiber pairs can be connected to a given RAU 14. One downlink optical fiber 16D could be provided to support multiple channels each using wavelength-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

The central unit 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

It may be desirable to provide both digital data services and RF communications services for client devices. For example, it may be desirable to provide digital data services and RF communications services in the building infrastructure 40 to client devices located therein. Wired and wireless devices may be located in the building infrastructure 40 that are configured to access digital data services. Examples of digital data services include, but are not limited to, Ethernet, WLAN, Worldwide Interoperability for Microwave Access (WiMax), Wireless Fidelity (WiFi), Digital Subscriber Line (DSL), and Long Term Evolution (LTE), Bluetooth®, GPS, NFC, etc. Ethernet standards could be supported, including but not limited to 100 Megabits per second (Mbs) (i.e., fast Ethernet) or Gigabit (Gb) Ethernet, or ten Gigabit (10G) Ethernet. Examples of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

In this regard, the optical-fiber based distributed communications system 10 in FIGS. 1 & 2 can be modified to provide such digital data services over optical fiber in the optical fiber-based distributed communications system 10 in FIGS. 1 & 2. The RF communications services and digital data services can be distributed over optical fiber to client devices, such as RAUs 14 for example. Digital data services can be distributed over optical fiber separate from the optical fiber distributing RF communications services. Alternatively, digital data services can be distributed over common optical fiber with RF communications services in an optical fiber-based distributed communications system. For example, digital data services can be distributed over common optical fiber with RF communications services at different wavelengths through WDM and/or at different frequencies through FDM. Examples of providing digital data services in an optical-fiber based distributed communications system are disclosed in co-pending U.S. patent application Ser. Nos. 13/025,719 and 12/892,424, all of which are incorporated herein by reference in their entireties.

However, it may be desired to provide digital data services in a distributed communications system as electrical signals over an electrical communications medium instead of optical signals communicated over optical fiber. In this regard, it would not be required to convert the digital data services for downlink services from electrical signals to optical signals for distribution over optical fiber to RAUs, where the optical signals for the digital data services are converted back to electrical signals, and vice versa for uplink distribution. For example, it may be more desirable to distribute the digital data services over an electrical signal medium. For example, an installation site for a distributed communications system may already include digital data services distributed over an existing electrical signal medium. When integrating or adding RF communications services to be distributed over optical fiber, only optical fiber for the RF communications services would need to be deployed. The existing electrical signal medium could be used or reused when integrating the distribution of digital data services and RF communications services in the distributed communications system. In this regard, a distributed communications system can be provided to provide digital data services and RF communications services. Such a distributed communications system could be provided by modifying or altering the optical-fiber based distributed communications system 10 in FIGS. 1 and 2 if desired, as an example. The RF communications services and digital data services can be distributed over optical fiber to client devices, such as RAUs for example. Digital data services can be distributed over an electrical signal medium separate from the optical fiber distributing the RF communications services.

Figure 3:
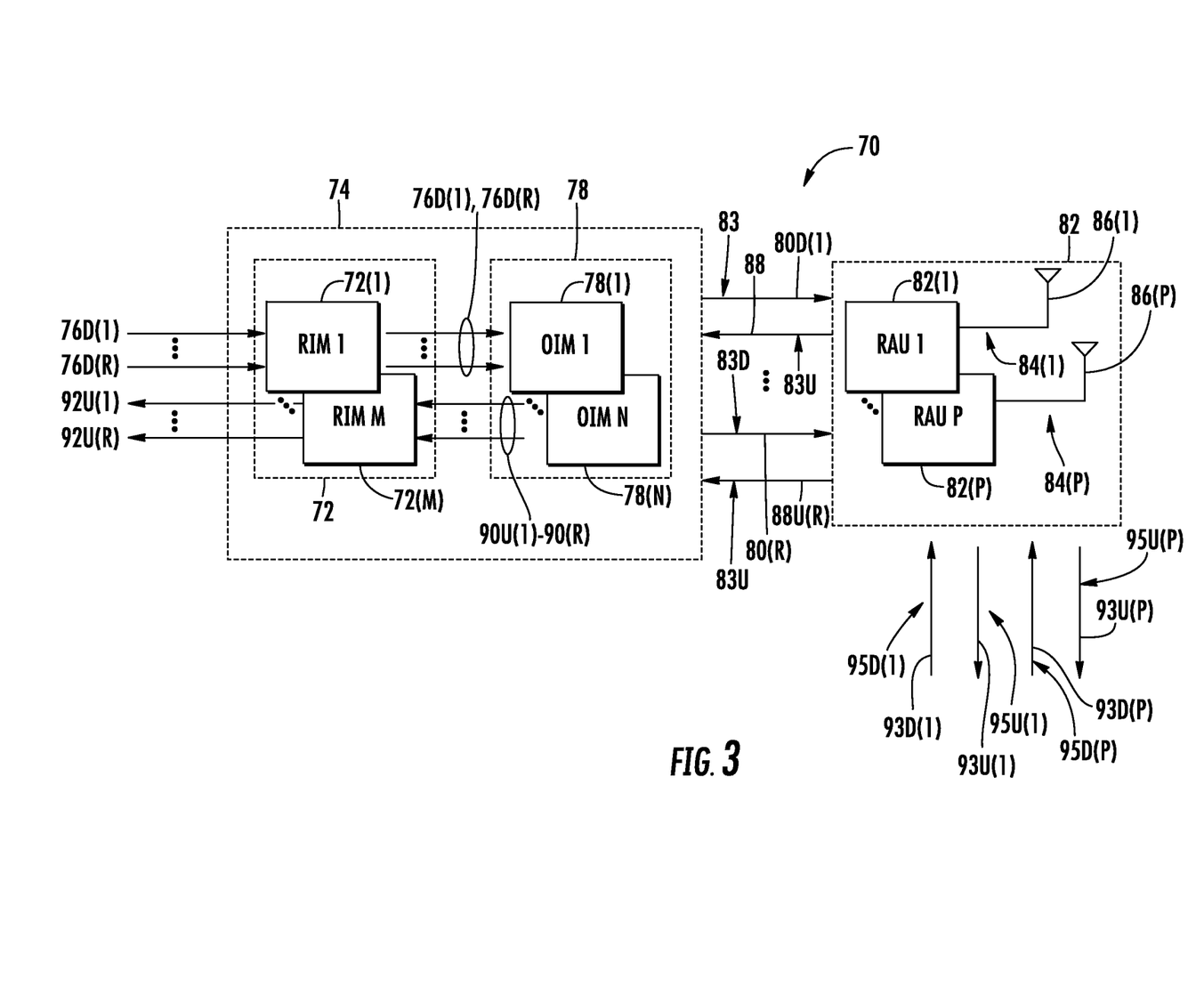
FIG. 3 is a schematic diagram of an exemplary distributed communications system with alternative equipment to provide RF communications services over optical fiber and digital data services as electrical signals to RAUs or other remote communications devices in an optical fiber-based distributed communications system.

FIG. 3 is a schematic diagram of another exemplary distributed communications system 70 that may be employed according to the embodiments disclosed herein to provide RF communications services and digital data services. In this embodiment, the distributed communications system 70 includes optical fiber for distributing RF communications services. The distributed communications system 70 also includes an electrical medium for distributing digital data services. As noted above, one or more links within these communications paths may be replaced by a FSO link.

With continuing reference to FIG. 3, the distributed communications system 70 in this embodiment is comprised of three (3) main components. One or more radio interfaces provided in the form of radio interface modules (RIMs) 72(1)-72(M) in this embodiment are provided in central unit 74 to receive and process downlink electrical RF communications signals 76D(1)-76D(R) prior to optical conversion into downlink optical RF communications signals. The processing of the downlink electrical RF communications signals 76D(1)-76D(R) can include any of the processing previously described above in the central unit 12. The notations "1-R" and "1-M" indicate that any number of the referenced component, 1-R and 1-M, respectively, may be provided. As will be described in more detail below, the central unit 74 is configured to accept a plurality of RIMs 72(1)-72(M) as modular components that can easily be installed and removed or replaced in the central unit 74. In one embodiment, the central unit 74 is configured to support up to four (4) RIMs 72(1)-72(4) as an example.

Each RIM 72(1)-72(M) can be designed to support a particular type of radio source or range of radio sources (i.e., frequencies) to provide flexibility in configuring the central unit 74 and the distributed communications system 70 to support the desired radio sources. For example, one RIM 72 may be configured to support the Personal Communications Services (PCS) radio band. Another RIM 72 may be configured to support the 700 MHz radio band. In this example, by inclusion of these RIMs 72, the central unit 74 would be configured to support and distribute RF communications signals on both PCS and LTE 700 radio bands. RIMs 72 may be provided in central unit 74 that support any frequency bands desired, including but not limited to the US Cellular band, Personal Communications Services (PCS) band, Advanced Wireless Services (AWS) band, 700 MHz band, Global System for Mobile communications (GSM) 900, GSM 1800, and Universal Mobile Telecommunications System (UMTS). RIMs 72 may be provided in central unit 74 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 72 may be provided in central unit 74 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 76D(1)-76D(R) are provided to a plurality of optical interfaces provided in the form of optical interface modules (OIMs) 78(1)-78(N) in this embodiment to convert the downlink electrical RF communications signals 76D(1)-76D(R) into downlink optical RF signals 80D(1)-80D(R). The notation "1-N" indicates that any number of the referenced component 1-N may be provided. The OIMs 78 may be configured to provide one or more optical interface components (OICs) that contain O/E and E/O converters, as will be described in more detail below. The OIMs 78 support the radio bands that can be provided by the RIMs 72, including the examples previously described above. Thus, in this embodiment, the OIMs 78 may support a radio band range from 400 MHz to 2700 MHz, as an example, so providing different types or models of OIMs 78 for narrower radio bands to support possibilities for different radio band-supported RIMs 72 provided in central unit 74 is not required. Further, as an example, the OIMs 78 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 78(1)-78(N) each include E/O converters to convert the downlink electrical RF communications signals 76D(1)-76D(R) to downlink optical RF signals 80D(1)-80D(R). The downlink optical RF signals 80D(1)-80D(R) are communicated over downlink optical fiber(s) 83D to a plurality of RAUs 82(1)-82(P). The notation "1-P" indicates that any number of the referenced component 1-P may be provided. O/E converters provided in the RAUs 82(1)-82(P) convert the downlink optical RF signals 80D(1)-80D(R) back into downlink electrical RF communications signals 76D(1)-76D(R), which are provided over downlinks 84(1)-84(P) coupled to antennas 86(1)-86(P) in the RAUs 82(1)-82(P) to client devices in the reception range of the antennas 86(1)-86(P).

E/O converters are also provided in the RAUs 82(1)-82(P) to convert uplink electrical RF communications signals 76U(1)-76U(R) received from client devices through the antennas 86(1)-86(P) into uplink optical RF signals 80U(1)-80U(R) to be communicated over uplink optical fibers 83U to the OIMs 78(1)-78(N). The OIMs 78(1)-78(N) include O/E converters that convert the uplink optical signals 80U(1)-80U(R) into uplink electrical RF communications signals 90U(1)-90U(R) that are processed by the RIMs 72(1)-72(M) and provided as uplink electrical RF communications signals 92U(1)-92U(R). Downlink electrical digital signals 93D(1)-93D(P) communicated over downlink electrical medium 95D(1)-95D(P) are provided to the RAUs 82(1)-82(P), such as from a DDS controller and/or DDS switch, separately from the RF communications services, as well as uplink electrical digital signals 93U(1)-93U(P) communicated over uplink electrical medium 225U(1)-225U(P). Power may be provided in the downlink and/or uplink electrical medium 95D(1)-95D(P) and/or 95U(1)-95U(P) is provided to the RAUs 82(1)-82(P). Again, it should be noted that any or all of the communications links referred to as optical fiber links or electrical medium links may be replaced by FSO links.

Figure 4:
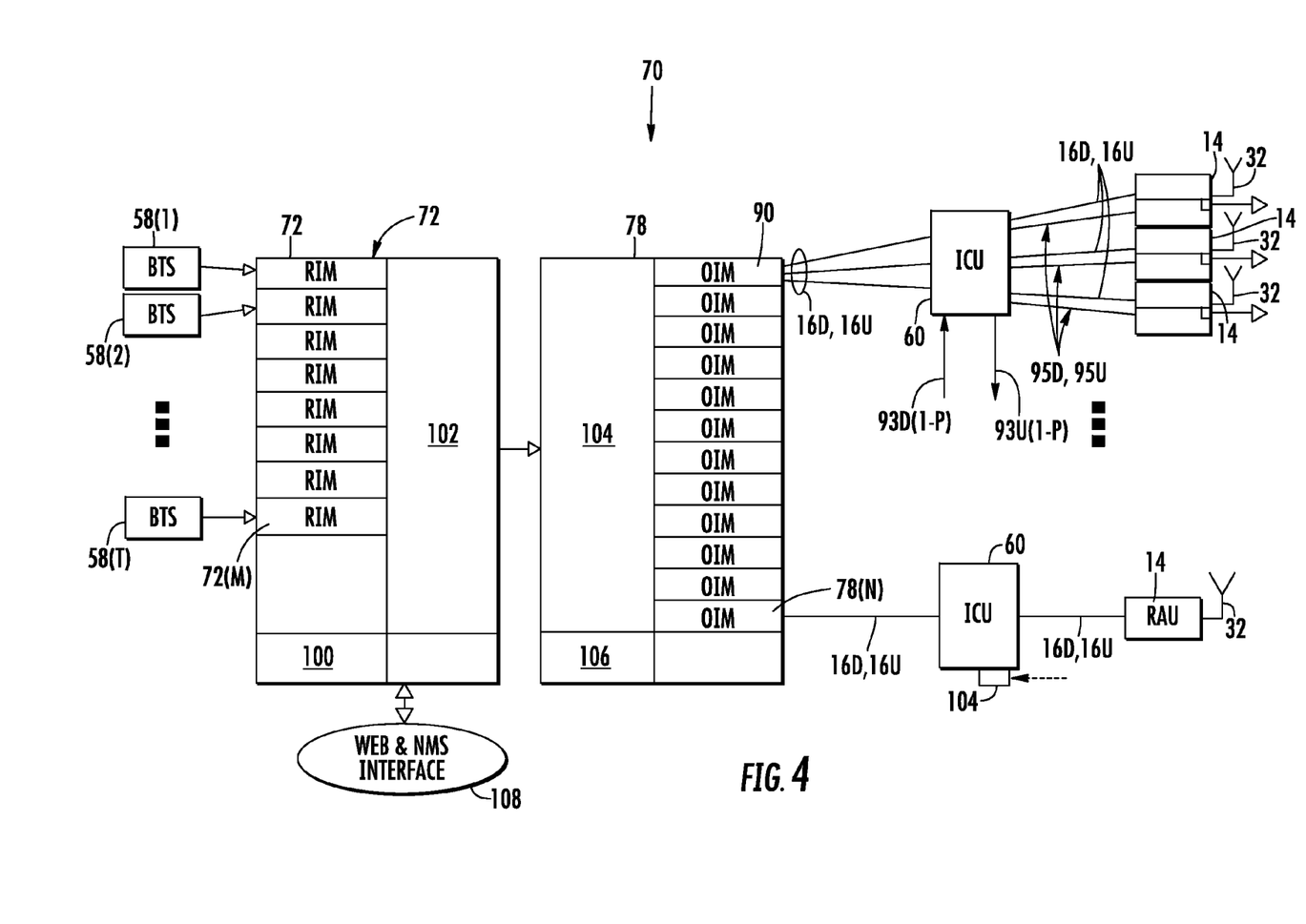
FIG. 4 is a schematic diagram of providing digital data services as electrical signals and RF communications services over optical fiber to RAUs or other remote communications devices in the optical fiber-based distributed communications system.

FIG. 4 is a schematic diagram of providing digital data services and RF communications services to RAUs and/or other remote communications units in the distributed communications system 70 of FIG. 3. Common components between FIGS. 3 and 4 and other figures provided have the same element numbers and thus will not be re-described. As illustrated in FIG. 4, a power supply module (PSM) 100 may be provided to provide power to the RIMs 72(1)-72(M) and radio distribution cards (RDCs) 102 that distribute the RF communications from the RIMs 72(1)-72(M) to the OIMs 78(1)-78(N) through RDCs 104. A PSM 106 may be provided to provide power to the OIMs 78(1)-78(N). An interface 108, which may include web and network management system (NMC) interfaces, may also be provided to allow configuration and communications to the RIMs 72(1)-72(M) and other components of the distributed communications system 70. As noted, one or more of the communications paths described in FIG. 4 may have one or more links therein replaced by a FSO link. For example, the link between RIMs 72 and OIMs 78 may be a FSO link. The link between the OIMs 78 and the ICU 60 may be a FSO link. The link between the ICU 60 and the RAU 14 may be a FSO link. The FSO links may be managed by the controllers within the distributed communications system 70 as desired.

Note that installation of FSO links may sometimes be challenging as the individuals installing the FSO components have to align the transmitters and receivers so that line of sight transmission is possible. The present disclosure facilitates such installation by providing an additional sighting laser (or other visible light source) coupled or integrated with the FSO module. For example, ICU 60 may have a laser 109 attached or integrated with a FSO module included in the ICU 60. The laser may be powered by a battery or other local power source and emit a beam of visible light. The installer points this beam of visible light in the general direction of the next component in the communications path (e.g., the RAU 14). The installer views the beam of visible light and confirms that it is hitting the RAU 14 such that line of sight to the RAU 14 is confirmed. After this coarse adjustment, the position of the FSO module can be adjusted to effectuate the best link between the elements of the communications path.

Figure 5A:
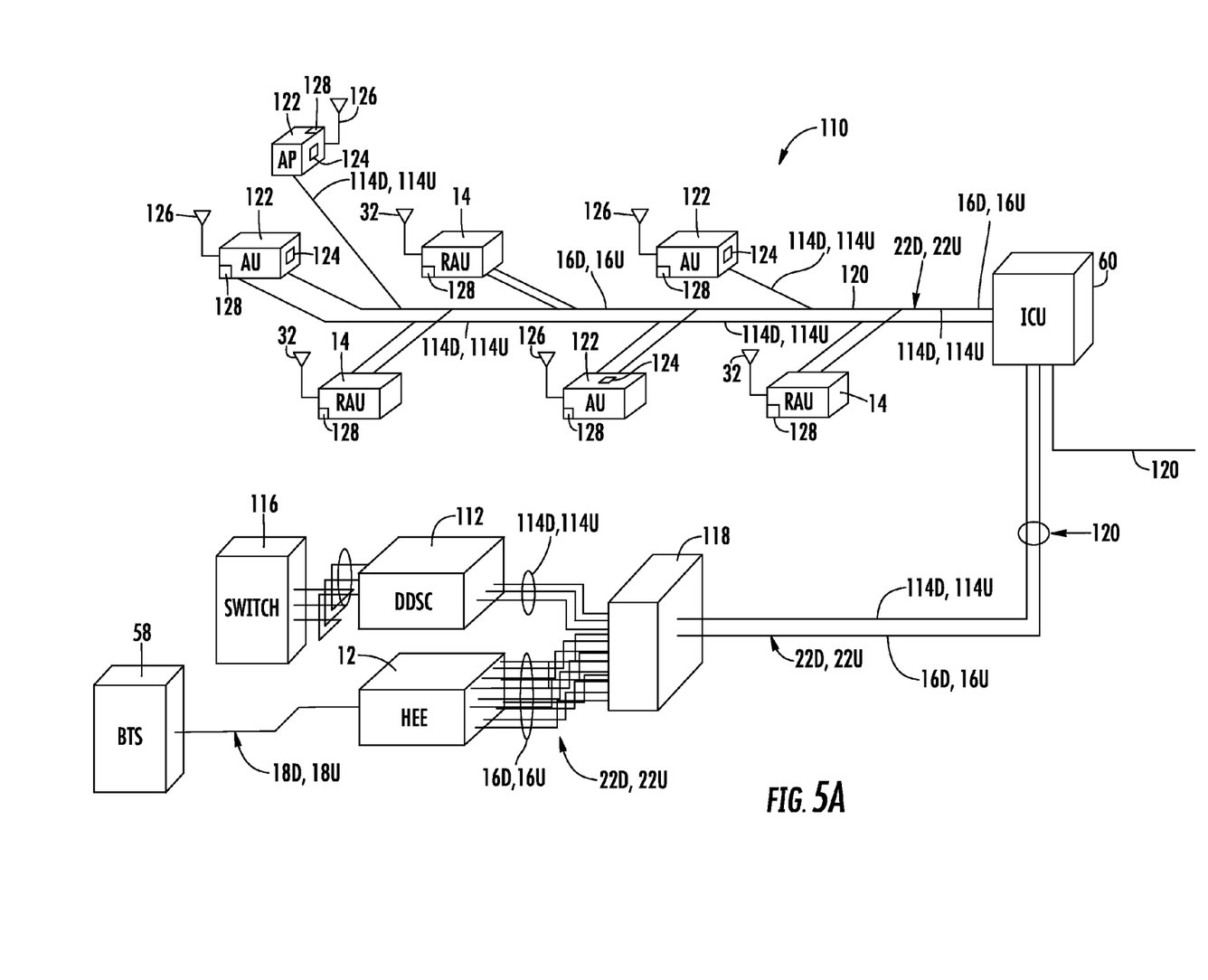
FIG. 5A is a schematic diagram of another exemplary embodiment of providing digital data services as electrical signals and RF communications services over optical fiber to RAUs or other remote communications devices in an optical fiber-based distributed communications system.

FIG. 5A is a schematic diagram of another exemplary embodiment of providing digital data services in a distributed communications system also configured to provide RF communications services. In this regard, FIG. 5A provides a distributed communications system 110. In this embodiment, the DDS controller 112 is co-located with the central unit 12, although in other not illustrated embodiments, the DDS controller 112 may be located in some position removed from the central unit 12. The downlink and uplink electrical medium 114D, 114U for distributing digital data services from the DDS switch 116 are also connected to the patch panel 118. The downlink and uplink optical fibers 16D, 16U for RF communications and the downlink and uplink electrical medium 114D, 114U for digital data services are then routed to the ICU 60.

The downlink and uplink optical fibers 16D, 16U for RF communications, and the downlink and uplink electrical medium 114D, 114U for digital data services, may be provided in a common cable, such as the cable 120, or provided in separate cables. Further, as illustrated in FIG. 5A, standalone access units (AUs) 122 may be provided separately from the RAUs 14 in lieu of being integrated with the RAUs 14. The standalone AUs 122 can be configured to contain the DDS controller 124. The AUs 122 may also each include antennas 126 to provide wireless digital data services in lieu of or in addition to wired services through the port 128 through the RAUs 14. As noted above, different ones of the links in the respective communications paths may be replaced by FSO links.

Figure 5B:
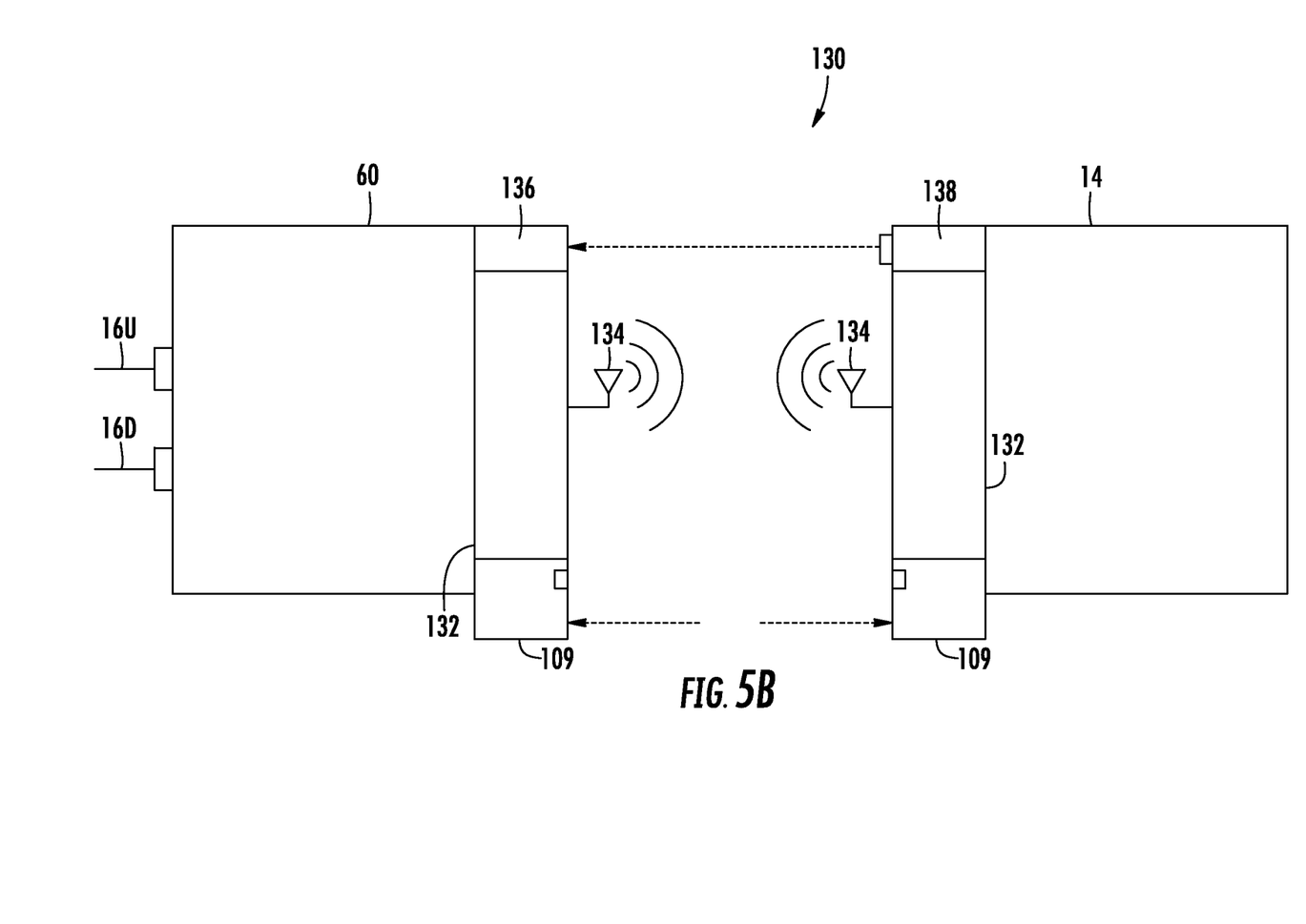
FIG. 5B is a portion of the distributed communications system of FIG. 5A with FSO links highlighted.

FIG. 5B illustrates an exemplary FSO link 130 in a communications path. In the illustrated embodiment, the FSO link 130 is between the ICU 60 and the RAU 14, although as noted elsewhere, the FSO link 130 may replace other portions of the communications path (e.g., between the central unit 12 and RAU 14, between central unit 12 and ICU 60, or other link). Each of the ICU 60 and the RAU 14 includes a FSO module 132. The FSO module 132 includes the aforementioned laser 109 and an antenna 134. The respective antennas 134 transmit and receive signals to each other, but must be within line of sight of one another. Thus, the laser 109 may assist in aligning the FSO modules 132. As illustrated, the FSO modules 132 may be incorporated into the corresponding component of the distributed communications system 10, or they may be proximate to the component, attached to the component, or otherwise positioned as desired.

With continuing reference to FIG. 5B, the FSO module 132 may include an optional secondary laser 136/laser receiver 138 which collectively may be used to provide power to the next component. That is, the secondary laser 136 may emit laser light that is incident on the laser receiver 138, which converts the energy within the laser light to power to provide power to the RAU 14. Use of the secondary laser 136 may shorten installation time as power cables do not have to be run to each element in the distributed communications system 10.

Figure 6:
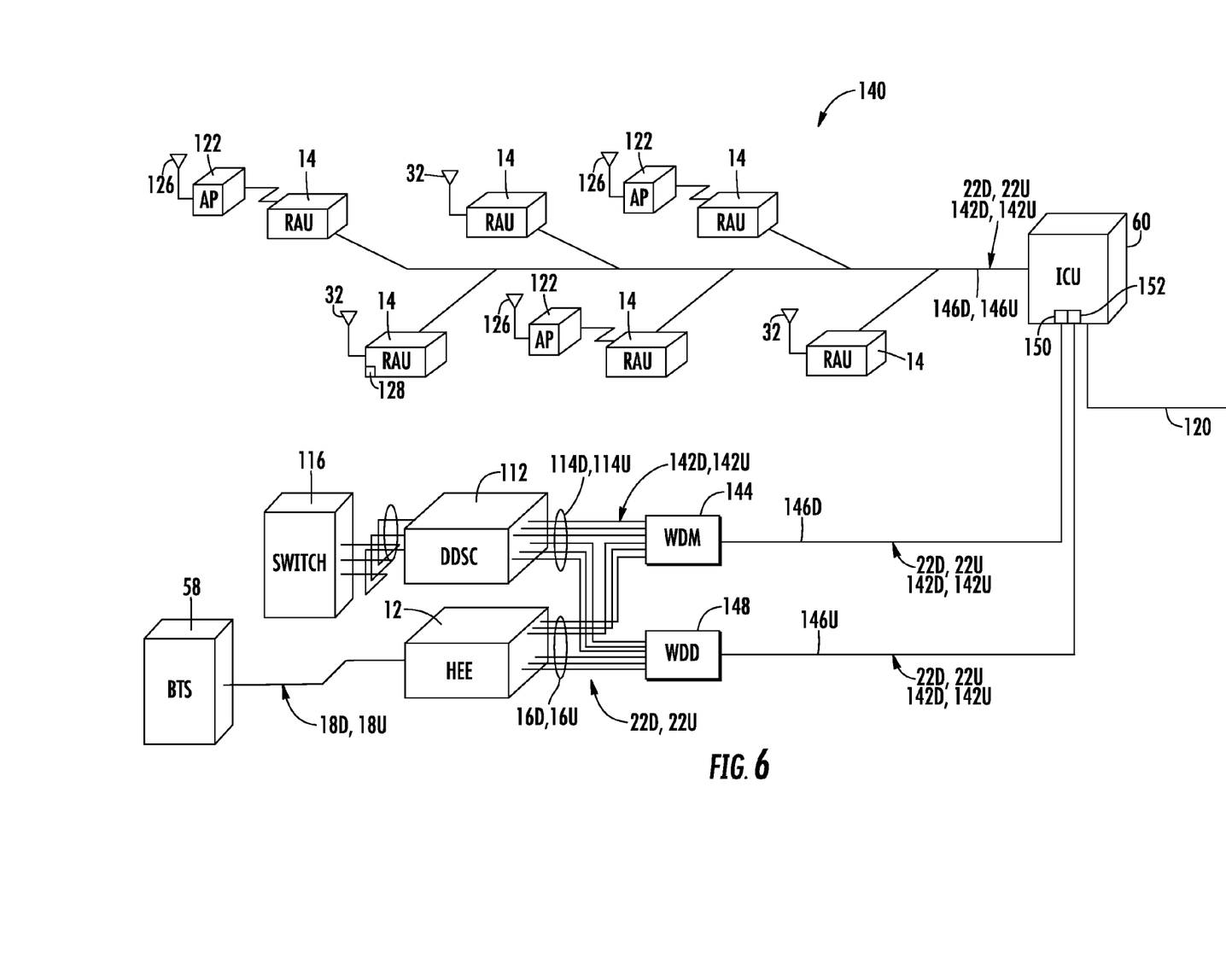
FIG. 6 is a schematic diagram of another exemplary embodiment of employing WDM in a co-located HEU and HMC to multiplex digital data services and RF communications services at different wavelengths over common downlink optical fibers and common uplink optical fibers in an optical fiber-based distributed communications system.

FIG. 6 is a schematic diagram of another exemplary embodiment of providing digital data services in an optical fiber-based distributed communications system. As illustrated in FIG. 6, an optical fiber-based distributed communications system 140 is provided that can also deliver digital data services. Instead of wavelength-division multiplexing the downlink optical RF signal(s) 22D for RF communications with the downlink optical digital signal(s) 142D for digital data services together on a common downlink optical fiber(s), a wavelength-division multiplexer 144 is provided. The wavelength-division multiplexer 144 multiplexes all downlink optical RF signals 22D with all downlink optical digital signal 142D to a single downlink optical fiber 146D. Similarly, a wavelength-division de-multiplexer 148 is provided to de-multiplex all uplink optical RF signals 22U from all uplink optical digital signals 142U from the common uplink optical fiber 146U at the desired wavelength. A wavelength-division de-multiplexer 150 and a wavelength-division multiplexer 152 are also employed in the ICU 60 to de-multiplex wavelength-division multiplexed downlink optical RF signals 22D and uplink optical digital signals 142U on the common downlink optical fiber 146D, and to wavelength-division multiplex uplink optical RF signals 22U and uplink optical digital signals 142U on the common uplink optical fiber 146U, respectively.

Alternatively, WDD and WDM could also be employed in the RAUs 14 to de-multiplex wavelength-division multiplexed downlink optical RF signals 22D and downlink optical digital signals 142D on the common downlink optical fiber 146D, and to wavelength-division multiplex uplink optical RF signals 22U and uplink optical digital signals 142U on the common uplink optical fiber 146U. In this alternative embodiment, de-multiplexing at the RAUs 14 could be done where a common WDM signal would be distributed from RAU 14 to RAU 14 in a daisy-chain configuration. Alternatively, optical splitters could be employed at break-out points in the fiber optic cable. Again, one or more of the links described in distributed communications system 140 may be replaced with an FSO link.

Figure 7:
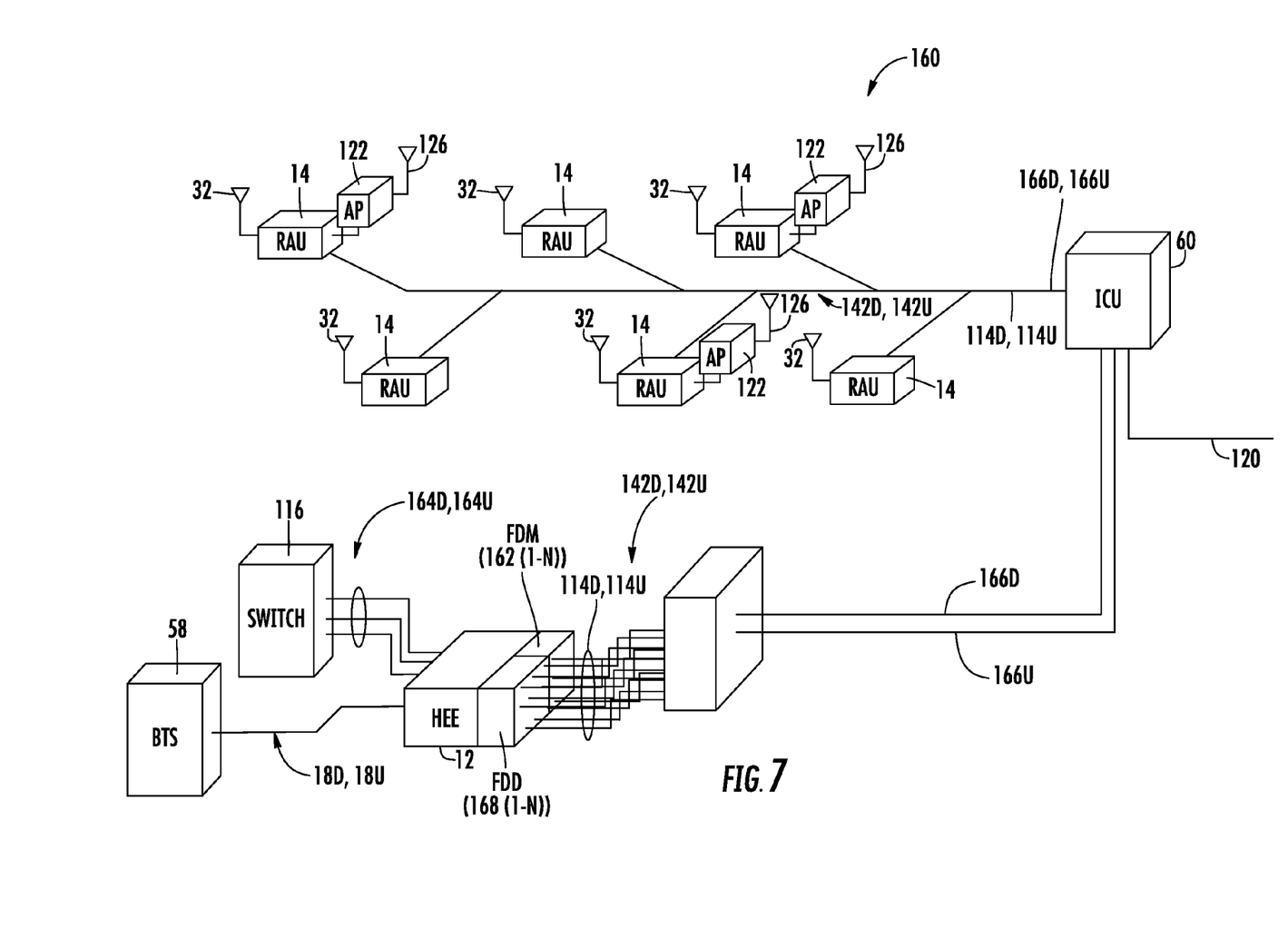
FIG. 7 is a schematic diagram of another exemplary embodiment of employing frequency-division multiplexing (FDM) to multiplex digital data services and RF communications services at different frequencies over downlink optical fibers and uplink optical fibers in an optical fiber-based distributed communications system.

FIG. 7 is a schematic diagram of another exemplary embodiment of an optical fiber-based distributed communications system providing digital data services. As illustrated in FIG. 7, an optical fiber-based distributed communications system 160 is provided. In this embodiment, frequency-division multiplexing (FDM) is employed to multiplex digital data services and RF communications services at different frequencies over downlink optical fibers and uplink optical fibers. One advantage of employing FDM is that E/O converters would be used simultaneously for converting RF communications signals and digital data signals into respective optical signals. Therefore, additional media converters for converting electrical digital signals to optical digital signals can be avoided to reduce complexity and save costs. For example, fast Ethernet (e.g., 100 Megabits/second (Mbs)) could be transmitted below the cellular spectrum (e.g., below 700 MHz). More than one (1) channel could be transmitted simultaneously in this frequency range.

In this regard, as illustrated in FIG. 7, a plurality of frequency-division multiplexers 162(1-N) are provided in a common housing of the central unit 12 and are each configured to multiplex the downlink electrical digital signal(s) 164D with the downlink electrical RF signal(s) 18D at different frequencies prior to optical conversion. In this manner, after optical conversion, a common optical fiber downlink 166D can carry frequency-division multiplexed downlink optical RF signal 22D and downlink optical digital signal 114D on the same downlink optical fiber 166D. Similarly, a plurality of frequency-division de-multiplexers 168(1-N) are provided in the common housing to de-multiplex an uplink optical RF signal 22U and an uplink optical digital signal 114U on an uplink optical fiber 166U. Frequency-division de-multiplexing (FDD) and FDM are also employed in the RAUs 14. FDD is employed in the RAU 14 to de-multiplex frequency multiplexed downlink electrical RF signals 18D and downlink electrical digital signals 164D after being converted from optical signals from the common downlink optical fiber to electrical signals. FDM is also provided in the RAU 14 to frequency multiplex uplink electrical signals in the RAU 14 before being converted to uplink optical RF signals 22U and uplink optical digital signals 142U provided on the common uplink optical fiber. Again, one or more links in the distributed communications system 160 may be replaced by FSO links.

Figure 8:
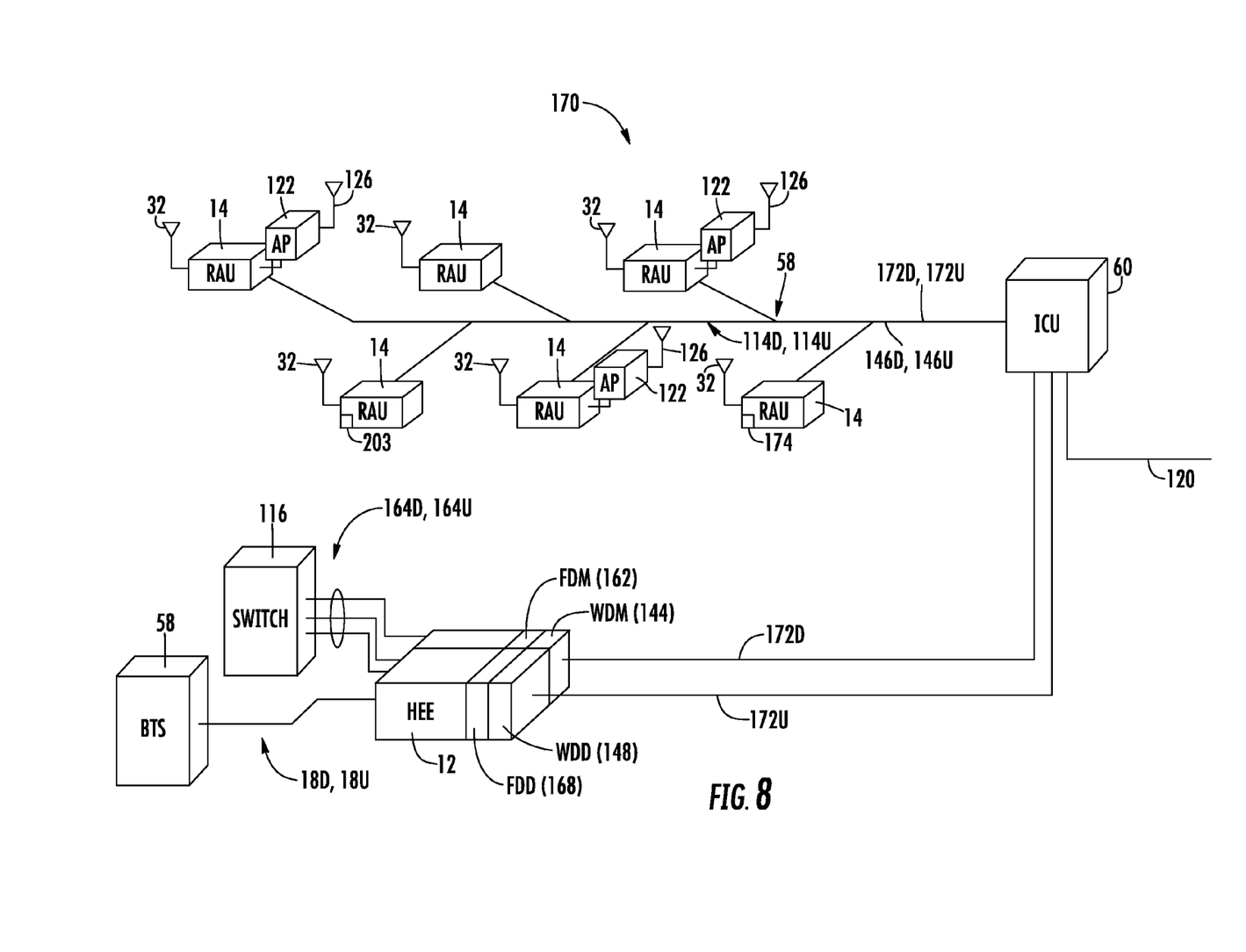
FIG. 8 is a schematic diagram of another exemplary embodiment of employing FDM and WDM to multiplex digital data services and RF communications services at different frequencies and at different wavelengths over downlink optical fibers and uplink optical fibers in an optical fiber-based distributed communications system.

FIG. 8 is a schematic diagram of another exemplary embodiment of an optical fiber-based distributed communications system that employs both WDM and FDM. In this regard, FIG. 8 illustrates an optical fiber-based distributed communications system 170. The optical fiber-based distributed communications system 170 employs a WDM 144 and WDD 148 combined with FDM 162 and FDD 168 of the optical fiber-based distributed communications system 160 of FIG. 7. The wavelength-division multiplexed and frequency-division multiplexed downlink signals are provided over downlink optical fiber 172D. The wavelength-division multiplexed and frequency-division multiplexed uplink signals are provided over uplink optical fiber 172U.

Options and alternatives can be provided for the above-described embodiments. A digital data services interface provided in an RAU or stand alone MC could include more than one digital data services port. For example, referring to FIG. 8 as an example, a switch 174, such as an Ethernet switch for example, may be disposed in the RAUs 14 to provide RAUs 14 that can support more than one digital data services port. An HMC could have an integrated Ethernet switch so that, for example, several APs could be attached via cables (e.g., Cat 5/6/7 cables) in a star architecture. The Ethernet channel could be used for control, management, and/or communications purposes for an optical fiber-based distributed communications system as well as the Ethernet media conversion layer. The HMC could be either single channel or multi-channel (e.g., twelve (12) channel) solutions. The multi-channel solution may be cheaper per channel than a single channel solution. Further, uplink and downlink electrical digital signals can be provided over mediums other than optical fiber, including electrical conducting wire and/or wireless communications, as examples.

Frequency up conversions or down conversions may be employed when providing FDM if RF communications signals have frequencies too close to the frequencies of the digital data signals to avoid interference. While digital baseband transmission of a baseband digital data signals below the spectrum of the RF communications signals can be considered, intermodulation distortion on the RF communications signals may be generated. Another approach is to up convert the digital data signals above the frequencies of the RF communications signals and also use, for example, a constant envelope modulation format for digital data signal modulation. Frequency Shift Keying (FSK) and Minimum Shift Keying (MSK) modulation are suitable examples for such modulation formats. Further, in the case of FDM for digital data services, higher-level modulation formats can be considered to transmit high data rates (e.g., one (1) Gb, or ten (10) Gb) over the same optical fiber as the RF communications signals. Multiple solutions using single-carrier (with e.g., 8-FSK or 16-QAM as examples) or multi-carrier (OFDM) are conceivable. Again, one or more links within the communications paths of the distributed communications system 170 may be replaced by FSO links.

Note that while the embodiments discussed above frequently use the BTS 58 as an exterior switch, other network switches may also be used including, but not limited to an access point, network connection, internet connection, or the like. Likewise, while in many cases the provision of cellular services is specifically contemplated in the exemplary embodiments, other RF and digital services may be provided through the distributed communication system.

Figure 9:
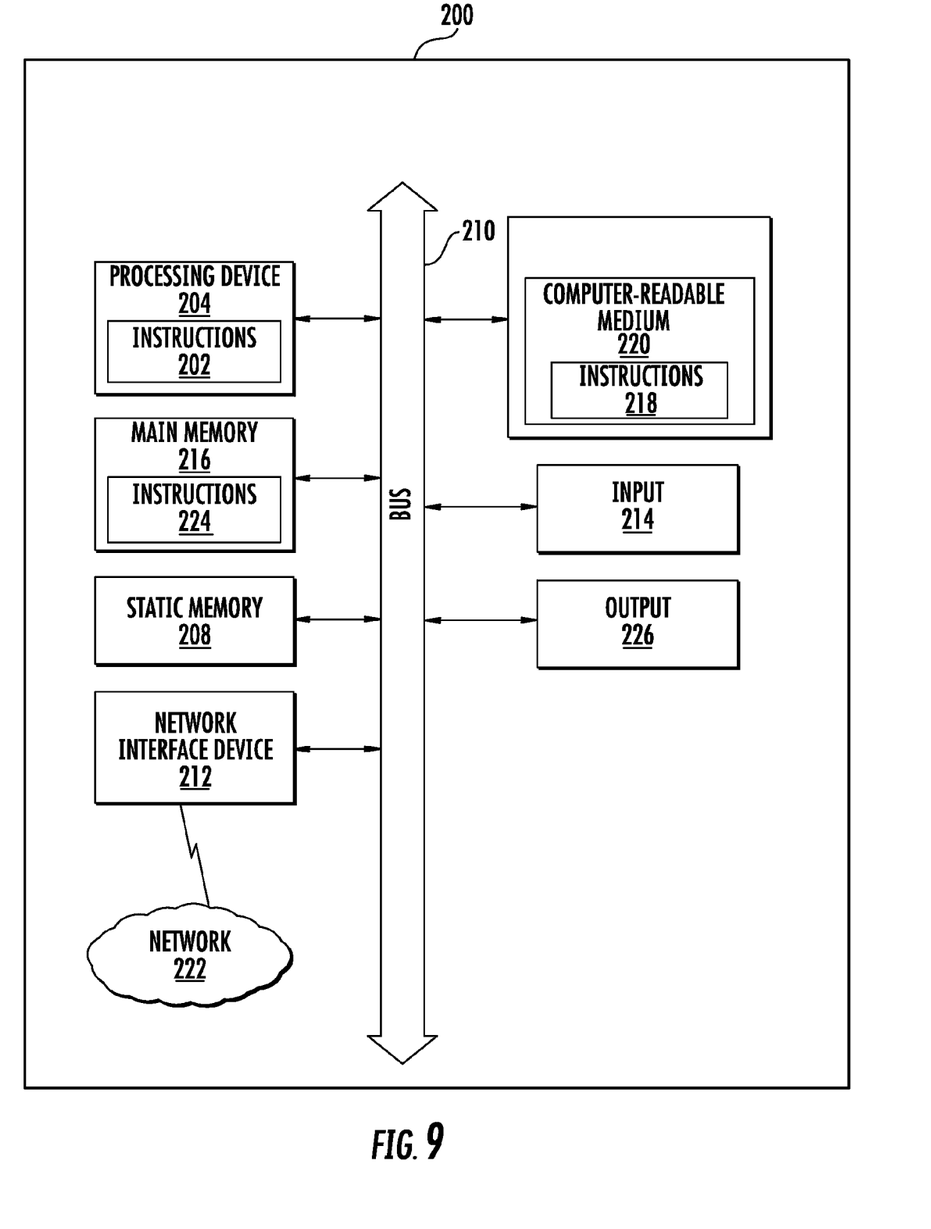
FIG. 9 is a schematic diagram of a generalized representation of an exemplary computer system that can be included in any of the modules provided in the exemplary distributed communications systems and/or their components described herein, including but not limited to a head end controller (HEC), wherein the exemplary computer system is adapted to execute instructions from an exemplary computer-readable media.

The central unit 12, the RAU 14, the ICU 60, and the FSO module 132 disclosed herein can include a computer system 200. In this regard, FIG. 9 is a schematic diagram representation of additional detail regarding an exemplary computer system 200 adapted to execute instructions from an exemplary computer-readable medium to perform power management functions. In this regard, the computer system 200 within which a set of instructions for causing the distributed communications system 10 to perform any one or more of the methodologies discussed herein may be executed. The computer system 200 may be connected (e.g., networked) to other machines in a LAN, an intranet, an extranet, or the Internet. The computer system 200 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The computer system 200 may include a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 200 in this embodiment includes a processing device or processor 204, a main memory 216 (e.g., read-only memory (ROM), flash memory, dynamic random access memory (DRAM) such as synchronous DRAM (SDRAM), etc.), and a static memory 208 (e.g., flash memory, static random access memory (SRAM), etc.), which may communicate with each other via the data bus 210. Alternatively, the processing device 204 may be connected to the main memory 216 and/or static memory 208 directly or via some other connectivity means. The processing device 204 may be a controller, and the main memory 216 or static memory 208 may be any type of memory.

The processing device 204 represents one or more general-purpose processing devices such as a microprocessor, central processing unit, or the like. More particularly, the processing device 204 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 204 is configured to execute processing logic in instructions 202 for performing the operations and steps discussed herein.

The computer system 200 may further include a network interface device 212. The computer system 200 also may or may not include an input 214 to receive input and selections to be communicated to the computer system 200 when executing instructions. The computer system 200 also may or may not include an output 226, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 200 may or may not include a data storage device that includes instructions 218 stored in a computer-readable medium 220. Instructions 224 may also reside, completely or at least partially, within the main memory 216 and/or within the processing device 204 during execution thereof by the computer system 200, the main memory 216 and the processing device 204 also constituting computer-readable medium. The instructions 224 may further be transmitted or received over a network 222 via the network interface device 212.

While the computer-readable medium 220 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed communications systems described herein may be employed in any circuit, hardware component, integrated circuit (IC), or IC chip, as examples. Memory disclosed herein may be any type and size of memory and may be configured to store any type of information desired. Skilled artisans may implement described functionalities in varying ways for each particular application.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers.

Many modifications and other embodiments of the embodiments set forth herein will come to mind to one skilled in the art to which the embodiments pertain having the benefit of the teachings presented in the foregoing descriptions and the associated drawings. The distributed communications systems can employ the antenna arrangements disclosed herein could include any type or number of communications mediums, including but not limited to electrical conductors, optical fiber, air (i.e., wireless transmission), and FSO. Any of distributed communications systems disclosed herein may be distributed antenna systems. The distributed communications systems may distribute and the antenna arrangements disclosed herein may be configured to transmit and receive any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Multiplexing, such as WDM and/or FDM, may be employed in any of the distributed communications systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims.

I claim:

1. A distributed communications system comprising:
    a central unit comprising at least one downlink input configured to receive downlink communications signals;
    a plurality of remote antenna units; and
    a communications path communicatively coupling the central unit and at least one of the remote antenna units;
    at least one of the remote antenna units being configured to receive the downlink communications signals over the communications path;
    wherein at least a portion of the communications path comprises at least one free-space-optics (FSO) communications link and at least one fiber optic link, wherein the FSO communications link comprises an FSO module having a laser configured to provide electrical power to the remote antenna unit.

2. The distributed communications system of claim 1 further comprising a distribution hub positioned at an intermediate position on the communications path.

3. The distributed communications system of claim 2 wherein the at least a portion of the communications path that comprises at least one FSO communications link comprises a link between the central unit and the distribution hub.

4. The distributed communications system of claim 2 wherein the at least a portion of the communications path that comprises at least one FSO communications link comprises a link between the distribution hub and at least one of the remote antenna units.

5. The distributed communications system of claim 1 wherein the at least a portion of the communications path that comprises at least one FSO communications link comprises a link between the central unit and at least one of the remote antenna units.

6. The distributed communications system of claim 1 wherein at least one of the remote antenna units is configured to receive at least one uplink communications signal from a client device and pass the at least one uplink communications signal to the central unit using the communications path.

7. The distributed communications system of claim 1 wherein the downlink communications signals comprise digital data signals.

8. The distributed communications system of claim 1 wherein the downlink communications signals comprise RF signals.

9. The distributed communications system of claim 1 wherein the FSO module comprises a visible light source.

10. A method for providing communications links in a distributed communications system having a plurality of remote antenna units, the method comprising:
    establishing a communications path between a central unit of a distributed communications system and at least one of the remote units of the distributed communications system wherein the communications path comprises at least one free-space-optics (FSO) link established using at least one FSO module,
    wherein establishing the communications path comprises establishing a communications path with at least one optical fiber link, and wherein
    the at least one FSO module comprises a visible light source configured to assist in aiming the at least one FSO module during installation and a laser configured to provide electrical power to the remote unit.

11. The method of claim 10 further comprising positioning a distribution hub at an intermediate position on the communications path.

12. The method of claim 11 further comprising positioning the at least one FSO link between the central unit and the distribution hub.

13. The method of claim 11 further comprising positioning the at least one FSO link between the central unit and the remote unit.

14. The method of claim 11 further comprising positioning the at least one FSO link between the distribution hub and the remote unit.

15. The method of claim 10 further comprising receiving, at the remote unit, at least one uplink communications signal from a client device; and
    passing the at least one uplink communications signal to the central unit using the communications path.

16. The method of claim 10 further comprising receiving downlink communications signals at an interface associated with the central unit.

17. The method of claim 16 wherein the downlink communications signals comprise at least one of digital data signals and RF signals.

* * * * *